United States Patent
Voigt et al.

(10) Patent No.: US 8,579,482 B2
(45) Date of Patent: Nov. 12, 2013

(54) DEBRIS PROTECTOR FOR VEHICLE LAMP ASSEMBLY

(75) Inventors: Derik Thomas Voigt, Dublin, OH (US); Aaron Wright, Ostrander, OH (US); Nick A. Massaro, Dublin, OH (US); Adam Patrick Gress, West Mansfield, OH (US); Jamison Weirup, Marysville, OH (US); Nathan M. Fisher, Dublin, OH (US); Joshua T. Glazier, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 274 days.

(21) Appl. No.: 13/181,358

(22) Filed: Jul. 12, 2011

(65) Prior Publication Data
US 2013/0016518 A1 Jan. 17, 2013

(51) Int. Cl.
*B60Q 1/00* (2006.01)

(52) U.S. Cl.
USPC .......................................... 362/505; 362/267

(58) Field of Classification Search
USPC ......... 362/487, 496, 505–507, 267, 546, 548, 362/549, 365, 368, 374, 375, 457
See application file for complete search history.

(56) References Cited

U.S. PATENT DOCUMENTS

| | | | |
|---|---|---|---|
| 3,467,822 A * | 9/1969 | Plume | 362/549 |
| 4,838,603 A | 6/1989 | Masoero et al. | |
| 5,685,628 A | 11/1997 | Feger et al. | |
| 6,138,319 A | 10/2000 | Benoit | |
| 7,677,779 B2 | 3/2010 | Schwab | |
| 7,815,349 B2 | 10/2010 | Yoshino | |
| 2001/0046140 A1 | 11/2001 | Chase et al. | |
| 2005/0068785 A1 | 3/2005 | Takeda et al. | |

FOREIGN PATENT DOCUMENTS

| | | |
|---|---|---|
| EP | 1653151 A1 | 5/2006 |
| JP | 10-134612 A | 5/1998 |
| JP | 2001-291409 A | 10/2001 |
| JP | 2005-11719 A | 1/2005 |
| TW | 557996 Y | 10/2003 |

\* cited by examiner

*Primary Examiner* — Thomas Sember
(74) *Attorney, Agent, or Firm* — Standley Law Group LLP

(57) ABSTRACT

A debris protector for use with a vehicle lamp assembly installed to an opening in a vehicle body panel or garnish to prevent the migration of accumulated road debris through a gap between the lamp assembly and the body panel opening. Such a debris protector is generally in the form of a cover element that is installable along an upper, hidden portion of a vehicle lamp assembly and an inner surface of a corresponding vehicle body panel or garnish to prevent road debris from accumulating on the lamp assembly near the body panel opening. Such a debris protector may also include a seal that is located between the cover element and the rear surface of a body panel or garnish to assist with the debris blocking function of the cover element.

19 Claims, 5 Drawing Sheets

DEBRIS PROTECTOR FOR VEHICLE LAMP ASSEMBLY

TECHNICAL FIELD

The present invention is directed to a device for preventing road debris from migrating to a visible vehicle surface in the area of a vehicle lamp assembly.

BACKGROUND

Vehicles, such as automobiles, may be equipped with one or more lamp assemblies in areas that may be particularly susceptible to the buildup of road debris (dirt, dust, rocks, etc.). For example, but without limitation, lamp assemblies installed to a front or rear vehicle bumper fascia may experience such a buildup of debris. In the latter case, the lamp assembly may be a fog lamp assembly that is installed in an opening in the rear bumper fascia of a vehicle or in an opening in a separate housing (garnish) that attaches to said bumper fascia. Because of the typical location of such a fog lamp assembly, road debris kicked up during driving of the vehicle has a tendency to accumulate on a hidden, upper surface of the fog lamp assembly that resides behind the bumper fascia. A similar situation may occur with other vehicle lamp assemblies.

Debris that accumulates in this manner may subsequently work its way from such a hidden lamp assembly surface into a design gap (or an unintended gap) between the lamp assembly and the opening in the bumper fascia, where it may thereafter become visible along an outer surface of the bumper fascia. This phenomenon is illustrated in FIG. 1. The migration of road debris in this manner is undesirable because its appearance may be aesthetically displeasing, especially when the associated lamp assembly is located in a highly visible area of the vehicle body.

In light of this problem, debris protector embodiments of the present invention and their methods of use are directed at preventing road debris from collecting on a vehicle lamp assembly in a manner that permits migration of the debris to a visible vehicle surface.

SUMMARY

Embodiments of a debris protector of the present invention may be used with a number of vehicle lamp assemblies, such as with lamp assemblies located in a bumper fascia, or in another vehicle panel that may be exposed to road debris during operation of the vehicle. Therefore, while an exemplary debris protector and associated method of use may be described herein with respect to a particular vehicle lamp assembly, it is to be understood that embodiments of the present invention are not limited to use with a particular vehicle lamp assembly or lamp location.

Embodiments of a debris protector of the present invention are generally designed for use with a vehicle lamp assembly that is installed through an opening in a vehicle body panel (e.g., a bumper fascia, fender, quarter panel, etc.) or through an opening in a separate housing (garnish) that attaches to such a vehicle body panel. Consequently, a vehicle lamp assembly of interest will normally have a portion that resides within the opening or is otherwise visible through the opening, and a portion that resides behind the body panel or garnish and is unseen (hidden) during normal viewing of the vehicle.

Embodiments of a debris protector of the present invention generally take the form of a cover element that may be associated with a given vehicle lamp assembly to prevent the aforementioned migration of debris. More particularly, since road debris tends to accumulate on an upper surface of the hidden portion of such a lamp assembly, a debris protector of the present invention is installable between the upper, hidden portion of the lamp assembly and a rear face of the corresponding vehicle body panel or garnish. In this manner, the affected hidden portion of the lamp assembly is partially covered by the cover element.

The cover element prevents road debris from accumulating on the vehicle lamp assembly in an area that may permit eventual migration of the road debris through a gap between the lamp assembly and the opening in the body panel or garnish, as described above. Rather, while road debris may accumulate on the cover element or along a more rearward portion of the lamp assembly, it is prevented from passing through the gap in the body panel and becoming visible. The cover element may also have a shape that discourages the accumulation of road debris thereon.

The cover element may be affixed to a portion of the vehicle lamp assembly, to a rear surface of the associated body panel or garnish, or to both. In one exemplary embodiment, the cover element is secured to an enclosure portion of a vehicle lamp assembly by threaded fasteners that are passed through the cover element and threaded into receiving holes in the enclosure. A debris protector of the invention may also include a seal that is located between the cover element and the rear surface of the body panel or garnish. Such a seal may assist with the debris blocking function of the cover element.

A cover element of the present invention may be of various configuration and size, as dictated by the lamp assembly and body panel or garnish to which it will be installed. A cover element of the present invention may have a number of different constructions, including but not limited to a molded plastic construction.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
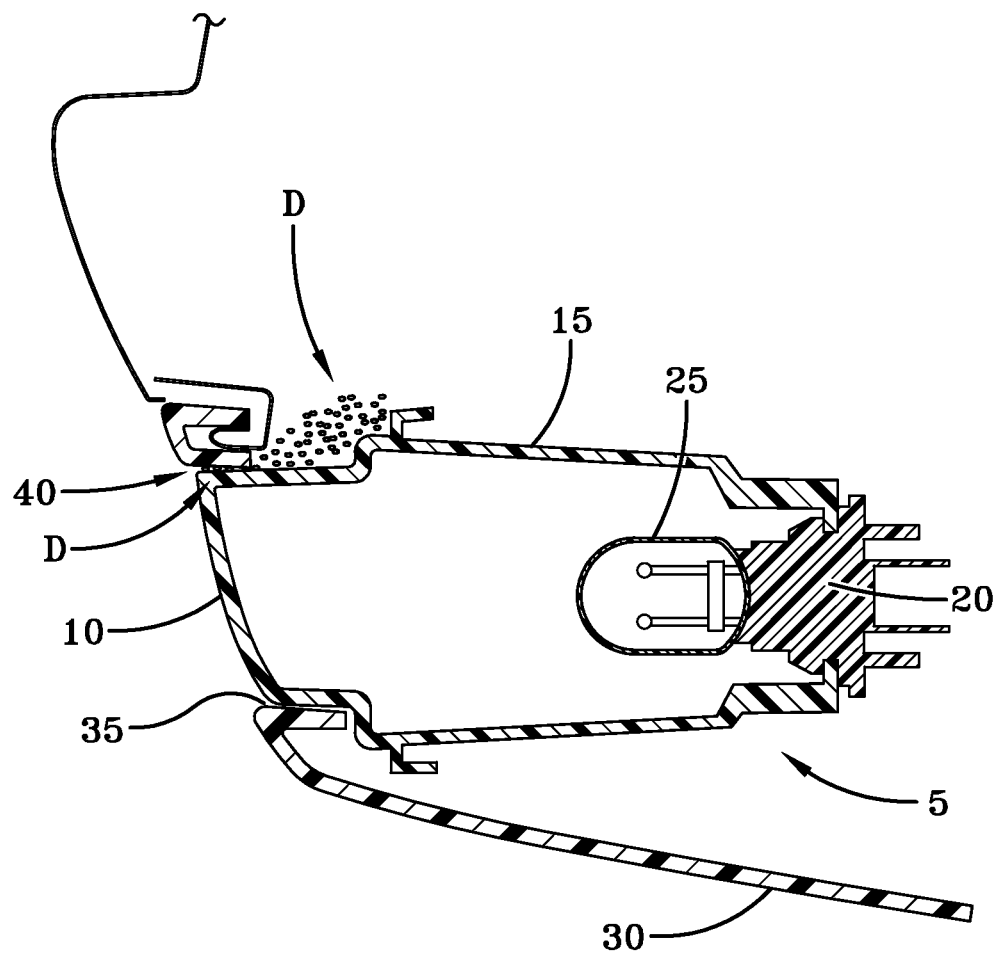
FIG. 1 is a cross-sectional view of a known vehicle lamp assembly in the form of a rear fog lamp installed to a vehicle rear bumper fascia, and is illustrative of the road debris accumulation problem described above.

The above-described and existing problem of vehicle lamp assembly debris accumulation and migration is amply illustrated in FIG. 1. As shown, an exemplary vehicle lamp assembly 5 is installed through an opening 35 in an exemplary vehicle rear bumper fascia 30. The lamp assembly 5 is shown to generally include a lens portion 10 that is visible through the fascia opening 35, and an enclosure portion 15 that is hidden behind the bumper fascia when installed thereto. As would be well understood by one of skill in the art, the enclosure portion 15 typically includes a socket 20 that receives a lamp (light bulb) 25.

In this case, the opening 35 in the bumper fascia 30 is dimensioned so that a small design gap 40 will exist between the periphery of the opening and the external surface of the lamp assembly portion (e.g., lens) that passes therethrough. The design gap helps to ensure that the lamp assembly 5 can be installed to the bumper fascia 30 without interference.

As illustrated in FIG. 1, the typical design of a vehicle lamp assembly 5 permits the accumulation of debris D—particularly along an upper surface thereof. This accumulation tends to be the most severe in the area where the lamp assembly 5 intersects the bumper fascia 30 due to the blocking nature of the bumper fascia wall. As depicted in FIG. 1, the accumulation of debris in this area unfortunately encourages its migration through the design gap 40, where it becomes visible from outside the vehicle.

Figure 2:
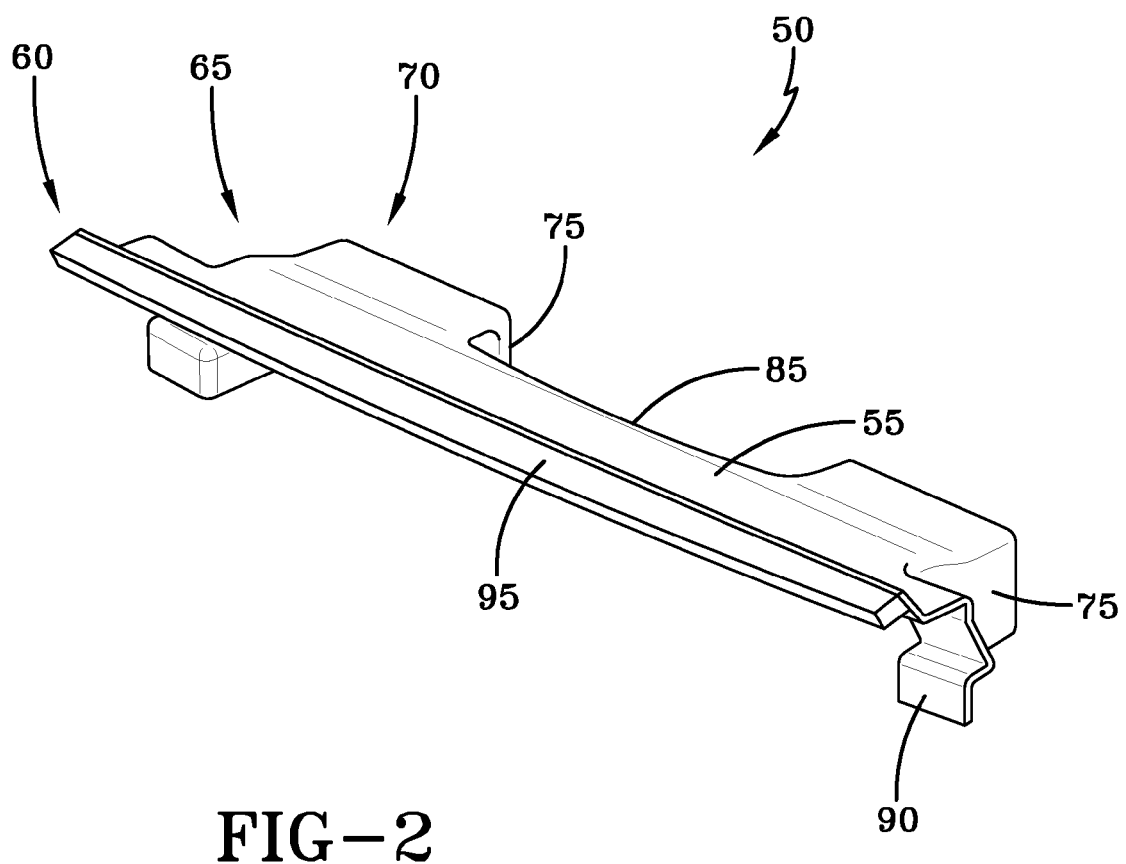
FIG. 2 is a perspective view of an exemplary embodiment of a debris protector of the present invention that is designed to remedy the debris accumulation problem illustrated in FIG. 1.

FIG. 2 depicts one exemplary embodiment of a debris protector 50 of the present invention that is suitable for use with the vehicle lamp assembly of FIG. 1. As shown, the debris protector 50 comprises a cover element 55 having a size and shape that allows the cover element to protect the vehicle lamp assembly 5 from debris accumulation.

Figure 3A:
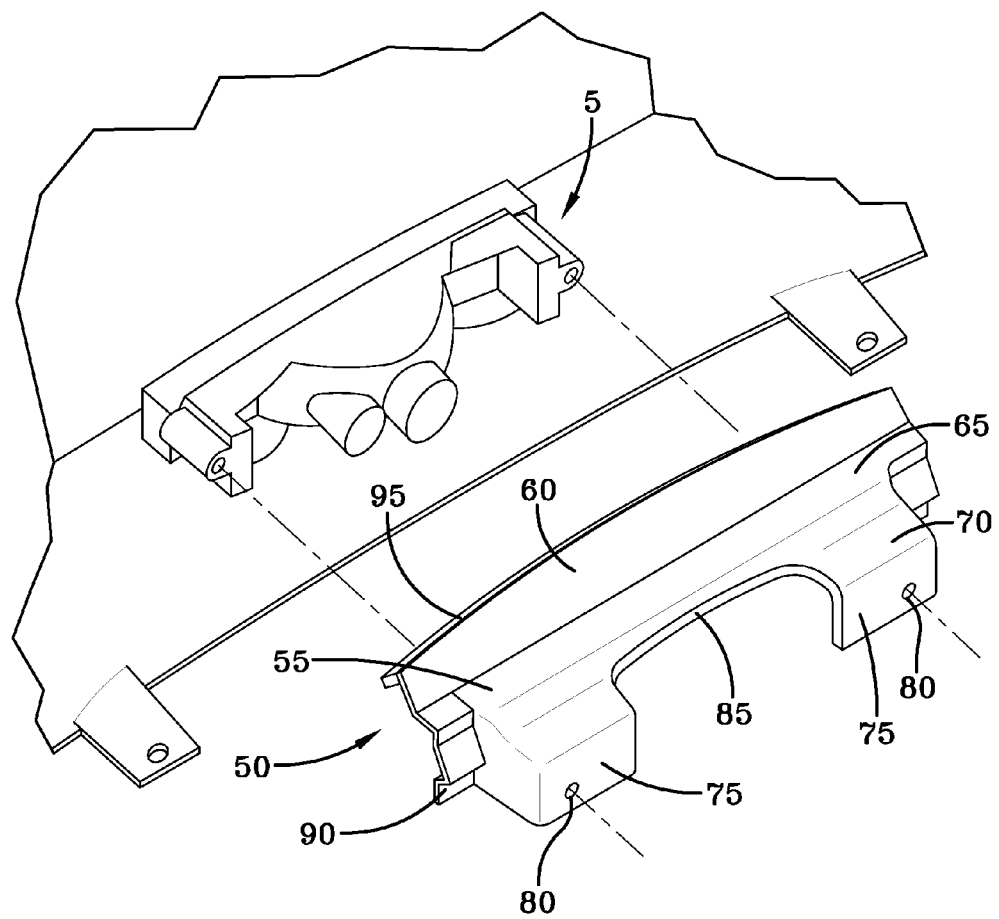
FIG. 3A depicts the debris protector of FIG. 2 just prior to its installation over a rear portion of the vehicle lamp assembly of FIG. 1.
Figure 3B:
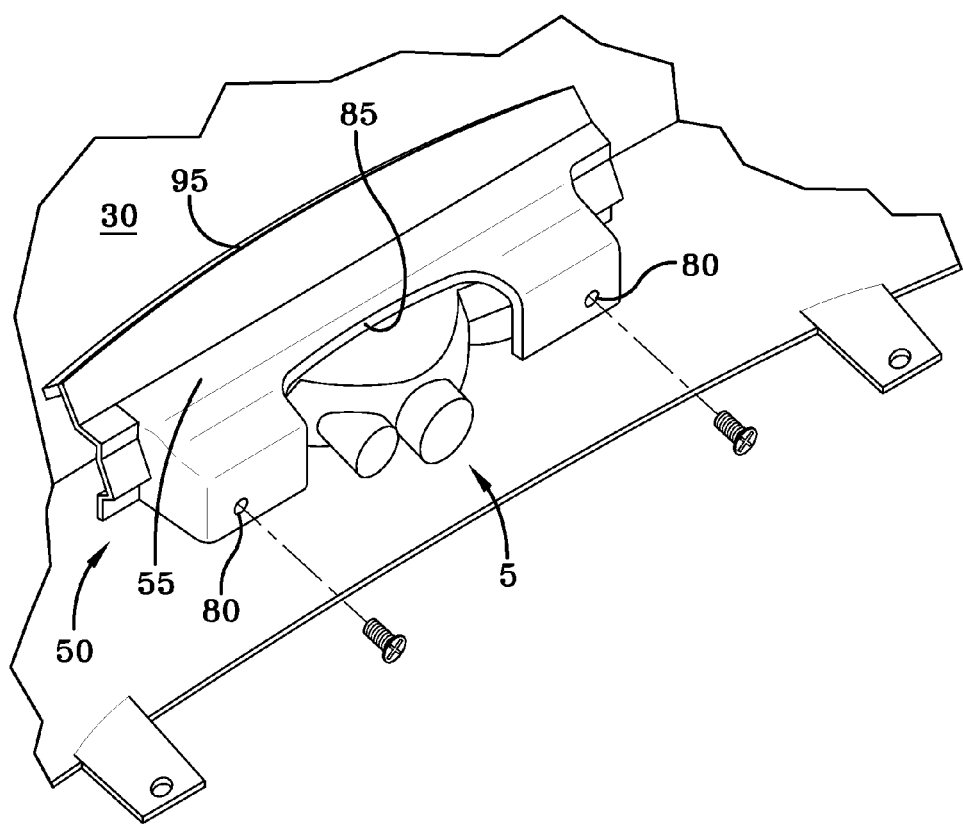
FIG. 3B depicts the debris protector of FIG. 2 installed over a rear portion of the vehicle lamp assembly of FIG. 1.

Referring also to FIGS. 3A-3B, it can be observed that the cover element 55 is essentially a shield that overlies at least a portion of the upper surface of the lamp assembly 5 when the cover element is located in an installed position. While the cover element 55 is shown to have a particular configuration for purposes of illustration, it should be understood that the configuration of a cover element of the present invention may vary along with varying lamp assemblies and body panels with which it may be used. Thus, certain cover element embodiments may include features that others lack, although it is desired that a cover element according to the invention at least provide for adequate shielding of an associated lamp assembly and be capable of being secured to the lamp assembly and/or to the corresponding vehicle body panel.

Figure 4:
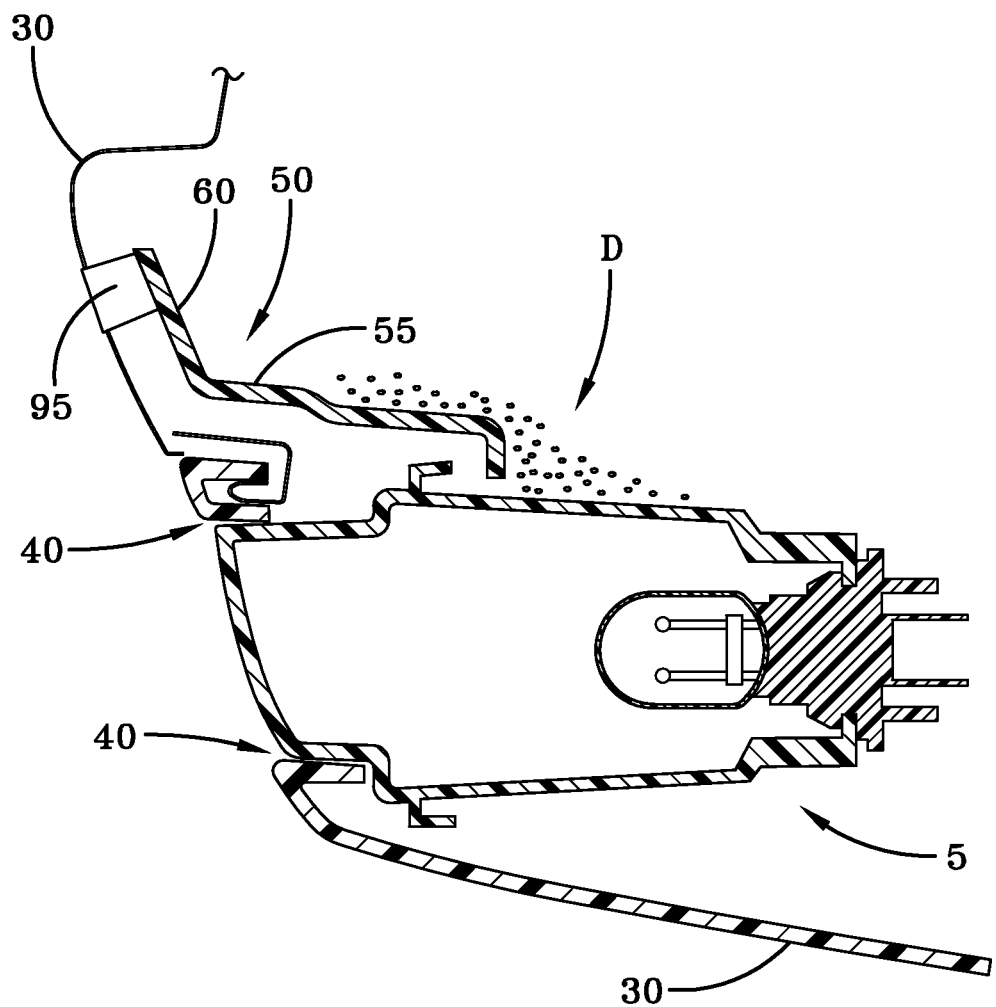
FIG. 4 is a cross-sectional view illustrating how the installed debris protector of FIG. 3B. operates to block debris from gathering on the vehicle lamp assembly and passing through the opening in the bumper fascia.

As further illustrated in FIGS. 2, 3A and 4, this particular cover element 55 has a forward portion 60 that may be engaged with or otherwise sealed to an inner surface of the bumper fascia when the cover element is installed. The forward portion 60 of the cover element 55 may be angled upward from a central portion 65 thereof, as shown, and may be shaped to substantially mimic the contour of a corresponding portion of the bumper fascia wall. The angle of the forward portion 60 may help to prevent debris accumulation on the cover element 55.

The central portion 65 of a cover element (when a central portion is actually present) may be substantially horizontally oriented when the debris protector is installed, or the central portion may be angled slightly downward from the forward portion toward the rear of the cover element, as shown in the example of FIG. 2. The latter angled configuration may also reduce the accumulation of debris on the cover element by encouraging the rearward movement of debris.

The cover element 55 is also shown to include a rearward portion 70. In this particular exemplary embodiment, the rearward portion 70 serves to secure the cover element to the lamp assembly 5 and to further inhibit the accumulation of debris along the lamp assembly-bumper fascia boundary. As to the securing function, this particular cover element is shown to include a pair of downwardly extending attachment ears 75 that mate with corresponding rear surfaces of the existing lamp assembly 5 when the cover element is installed (see FIGS. 3A-3B). This design helps to properly locate and orient the cover element 55 with respect to the lamp assembly 5, but debris protectors of the present invention are not limited to such a design. The rearward portion 70 of the cover element also preferably extends downward some distance or otherwise terminates near the upper surface of the lamp assembly enclosure 15 so as to limit the gap therebetween and inhibit the intrusion of debris.

A cover element of the present invention may be manufactured from a variety of materials—but preferably from materials that are resistant to corrosion or the other effects of contact with the environment in which a vehicle may be operated. In a preferred, but not exclusive, embodiment, the cover element is molded from a material such as an impact modified (filled) thermoplastic polyolefin (e.g., polypropylene) or another suitable plastic.

As shown, the cover element 55 may be secured to the lamp assembly 5 with threaded fasteners that pass through corresponding holes 80 in the attachment ears 75 and engage like-threaded receiving holes in the lamp assembly enclosure portion 15. Other attachment means such as, but not limited to, rivets, adhesives, tapes, hook and loop fasteners, or plastic welding may also be employed. In other embodiments, the cover element may be alternatively affixed to a vehicle body panel, or may be affixed to both a lamp assembly and a body panel.

Debris protector cover elements of the present invention may have other features such as a recessed or cut out section 85 that facilitate access to the socket 20 and lamp 25 of the lamp assembly 5. Lower support legs 90 may also be provided to help stabilize and prevent movement or flexure of the cover element 55 once installed to the lamp assembly 5. The lower support legs 90 may also engage the bumper fascia 30 to help secure the cover element 55 and/or to help stabilize the lamp assembly. The existence, size and configuration of such a recess or support legs will be largely determined by the design of the lamp assembly and bumper fascia to which the debris protector will be installed.

In certain embodiments of a debris cover of the present invention, a forward portion of the cover element may directly contact an inner surface of an associated vehicle body panel. Depending on various factors such as the contours of the body panel and possibly the materials of the body panel and cover element, this contact may provide a sufficient seal against the intrusion of debris. Alternatively, a seal element may be located between the cover element and the body panel.

One such seal element 95 is illustrated in FIGS. 2-4. As shown, the seal element 95 is attached to a contacting face of the forward portion 60 of the debris protector cover element 55. The seal 95 functions to prevent debris from passing through what might otherwise be a gap between the cover element 55 and the inner surface of the bumper fascia 30. As can be best observed in FIGS. 2 and 3A-3B, the seal element 95 runs the entire length of the cover element forward portion 60 for this purpose, although such might not be the case with other debris cover embodiments. Various types of seal materials may be used for such a seal element. In the exemplary debris protector embodiment shown and described herein, the seal element 95 is manufactured from a foam material, however, other materials such as plastics, rubbers, etc., may also be used. When used, a seal may be adhered to the cover element, to the vehicle body panel, or to both.

Operation of a debris protector of the present invention can be better understood by reference to the installed exemplary debris protector 50 as shown in FIG. 3B and FIG. 4. Specifically, and as best depicted in FIG. 4, the debris protector 50 acts as a shield that prevents debris D from gathering on an upper surface of the vehicle lamp assembly 5 in an area where it could access and migrate through the design gap 40 (or an unintended gap) between the lamp assembly and bumper fascia 30. Depending on the specific design, some debris D may be permitted to collect on an upper surface of the of the cover element 55, or a more rearward upper surface of the lamp assembly 5, but in any case, debris is prevented from collecting in a location where it could migrate to an exterior surface of the bumper fascia 30. In addition to generally shielding an area of interest on the vehicle lamp assembly 5, the design of the cover element may encourage a rearward movement of accumulated debris and/or may be made from a material, or coated with a material, that generally discourages adhesion of debris to the cover element.

While certain embodiments of the present invention are described in detail above for the purpose of illustration, the scope of the invention is not to be considered limited by such disclosure, and modifications are possible without departing from the spirit of the invention as evidenced by the following claims:

What is claimed is:

1. A debris protector for a vehicle lamp assembly installed to an opening in a vehicle body panel, comprising:
    a cover element adapted to overlie at least a portion of said vehicle lamp assembly along its intersection with said vehicle body panel, said cover element including a forward portion for substantially sealing directly or indirectly with an inner surface of said body panel and an attachment portion for securing said cover element to said lamp assembly, said cover element tapering downward in a forward to rearward direction to discourage the accumulation of debris thereon;
    wherein, when installed, said debris protector will prevent an accumulation of road debris along said lamp assembly-body panel intersection such that debris cannot pass through a lamp assembly opening provided in said body panel.

2. The debris protector of claim 1, further comprising a sealing element located along a contacting face of said forward portion of the cover element.

3. The debris protector of claim 2, wherein said sealing element is a foam strip.

4. The debris protector of claim 1, wherein said attachment portion is a rearward portion of said cover element.

5. The debris protector of claim 4, wherein said rearward portion includes at least one downwardly extending attachment ear that is adapted to engage a rearward portion of a vehicle lamp assembly to which it is installed.

6. The debris protector of claim 5, wherein said cover element is secured to said lamp assembly by threaded fasteners.

7. The debris protector of claim 1, further comprising at least one lower support leg adapted to contact a body panel over which said lamp assembly is installed.

8. The debris protector of claim 1, wherein said cover element includes a recessed area for facilitating access to a socket portion of a lamp assembly over which said cover element is installed.

9. The debris protector of claim 1, wherein said cover element is of molded plastic construction.

10. A debris protector for a vehicle lamp assembly installed in a corresponding opening in a vehicle body panel, comprising:
    a cover element adapted to overlie at least a portion of said vehicle lamp assembly along a location where said lamp assembly passes through an opening in said vehicle body panel, said cover element including a forward portion adapted to receive a sealing element for sealing said forward portion of said cover element with an inner surface of said body panel, and a rearward portion having at least one downwardly extending attachment ear adapted and located to secure said cover element to said lamp assembly by engaging a rearward portion thereof; and
    said sealing element associated with a contacting face of said forward portion of said cover element so as to reside between said cover element and an inner surface of said body panel when said debris protector is installed;
    wherein, when installed, said debris protector will prevent an accumulation of road debris along said lamp assembly-body panel intersection such that debris cannot pass through said lamp assembly opening provided in said body panel.

11. The debris protector of claim 10, wherein said sealing element is a foam strip.

12. The debris protector of claim 11, wherein said cover element is secured to said lamp assembly by threaded fasteners.

13. The debris protector of claim 10, wherein said cover element tapers downward in a forward to rearward direction to discourage the accumulation of debris thereon.

14. The debris protector of claim 10, further comprising at least one lower support leg adapted to contact a body panel to which said lamp assembly is installed.

15. The debris protector of claim 10, wherein said cover element includes a recessed area for facilitating access to a socket portion of a lamp assembly to which the cover element is installed.

16. The debris protector of claim 10, wherein said cover element is of molded plastic construction.

17. A vehicle lamp and debris protector assembly adapted for installation to a vehicle body panel, comprising:
    a lens portion on said vehicle lamp, said lens portion adapted to be visible through a corresponding opening in said vehicle body panel and an enclosure portion that resides behind said vehicle body panel when said lamp is installed thereto, said enclosure portion adapted to mate with a cover element for attachment of said cover element to said vehicle lamp;
    a cover element adapted to overlie at least a portion of said vehicle lamp along a location where said lamp passes from an inner surface of said vehicle body panel through said opening therein, said cover element including a forward portion adapted to receive a sealing element for sealing said forward portion of said cover element with said inner surface of said body panel, said forward portion tapering downward to a rearward attachment portion having at least one downwardly extending attachment ear for securing said cover element to a rear face of said enclosure portion of said vehicle lamp; and
    said sealing element associated with a contacting face of said forward portion of said cover element so as to reside between said cover element and said inner surface of said body panel when said debris protector is installed;
    wherein, when installed, said debris protector will prevent an accumulation of road debris along said lamp assembly-body panel intersection such that debris cannot pass through said lamp assembly opening provided in said body panel.

18. The assembly of claim 17, wherein said rear face of said vehicle lamp enclosure includes at least one threaded hole that is provided to receive at least one threaded fastener that may be passed through a corresponding hole(s) in said at least one downwardly extending attachment ear of said cover element.

19. A debris protector for a vehicle lamp assembly installed to an opening in a vehicle body panel, comprising:
   a cover element adapted to overlie at least a portion of said vehicle lamp assembly along its intersection with said vehicle body panel, said cover element including a forward portion for substantially sealing directly or indirectly with an inner surface of said body panel, and a rearward attachment portion having at least one downwardly extending attachment ear that is adapted to engage a rearward portion of a vehicle lamp assembly for securing said cover element thereto; and
   threaded fasteners securing said cover element to said vehicle lamp assembly;
   wherein the function of said debris protector is to prevent an accumulation of road debris along said lamp assembly-body panel intersection such that debris cannot pass through a lamp assembly opening provided in said body panel.

* * * * *